(12) United States Patent
Pierce

(10) Patent No.: US 6,471,029 B1
(45) Date of Patent: Oct. 29, 2002

(54) METHOD AND APPARATUS FOR DISTRIBUTING PARTICLES SUCH AS GRAIN

(76) Inventor: Steve Pierce, 633 Highway 91, Walnut Ridge, AR (US) 72476

( * ) Notice: Subject to any disclaimer, the term of this patent is extended or adjusted under 35 U.S.C. 154(b) by 0 days.

(21) Appl. No.: 09/610,315

(22) Filed: Jul. 5, 2000

Related U.S. Application Data

(63) Continuation-in-part of application No. 60/210,054, filed on Jun. 7, 2000.

(51) Int. Cl.$^7$ ............................. B65G 11/00; B65G 3/04
(52) U.S. Cl. ......................... 193/14; 193/29; 414/299; 414/808
(58) Field of Search ..................... 193/14, 29; 414/299, 414/800, 808, 295, 296, 316

(56) References Cited

U.S. PATENT DOCUMENTS

| | | | |
|---|---|---|---|
| 2,491,446 A | 12/1949 | Hagerbaumer | 208/170 |
| 2,646,407 A | 7/1953 | Lassiat et al. | 502/47 |
| 3,868,028 A | 2/1975 | Mausser | |
| 3,961,693 A | 6/1976 | Bruecker | 193/14 |
| 4,029,220 A | 6/1977 | Greaves | 214/35 R |
| 4,240,772 A | 12/1980 | Wyatt | |
| 4,342,532 A | 8/1982 | Voegele | |
| 4,399,846 A | 8/1983 | De Souza Dias et al. | 141/192 |
| 4,437,613 A | 3/1984 | Olson | |
| 4,555,210 A | 11/1985 | Wigram | |
| 4,611,965 A | 9/1986 | Dixon et al. | |
| 4,623,056 A | 11/1986 | Flaugher | |
| 4,902,185 A | 2/1990 | Dixon et al. | |
| 5,372,467 A | 12/1994 | Harris | |
| 5,403,141 A | 4/1995 | Rauser | |
| 5,803,695 A | 9/1998 | Schlagel | |

FOREIGN PATENT DOCUMENTS

| GB | 427201 | 4/1935 | ................. 193/14 |
|---|---|---|---|

*Primary Examiner*—Jack Lavinder
*Assistant Examiner*—Xuan Lan Nguyen
(74) *Attorney, Agent, or Firm*—Mark Rogers; Gary N. Speed

(57) ABSTRACT

A method and apparatus are disclosed in which the apparatus has a hopper and a tube secured to the hopper, the tube having an opening between distal and proximal end portions thereof. The apparatus may have a second tube secured to the first tube at the opening, and the second tube may extend substantially vertically downward. The lower end of the second tube may be aligned to terminate at a vertical level that is substantially equal to a vertical level of an opening in the distal end portion of the first tube. A Y-shaped tube may be secured to the distal end of the first tube to further distribute the grain. In use, grain is introduced into the hopper, and a first portion is passed to a first tube. The first portion of grain is divided into second and third portions, the second portion is passed through a second tube, and the third portion is passed to a distal end of the first tube. The third portion may be further divided into fourth and fifth portions within a third tube, and the grain may be discharged from each such tube at substantially the same height. Grain may be introduced to form piles until the peak of each such pile reaches a desired, substantially equal height, at which time the grain may be leveled within the container and the process repeated.

5 Claims, 5 Drawing Sheets

US 6,471,029 B1

METHOD AND APPARATUS FOR DISTRIBUTING PARTICLES SUCH AS GRAIN

CROSS REFERENCE TO RELATED APPLICATIONS

This is a continuation-in-part of U.S. Provisional Patent Application No. 60/210,054, filed on Jun. 7, 2000.

BACKGROUND OF THE INVENTION

This invention relates to a method and apparatus for distributing particles within a container, and more particularly, to a method and apparatus for evenly distributing grain within a grain bin.

Harvested grain is typically stored and dried in large containers such as silos or bins. A grain bin is typically tall and cylindrical and typically has a conical roof with an opening at an upper central area for introducing the grain to be stored. Pouring the grain directly into the container without using a distributing device leads to uneven grain distribution within the container and inefficient use of the container space. Attempts to occasionally level grain that has been deposited into the container without using a distributing device can be time consuming, labor intensive, and hazardous.

Grain distributors are generally known and offer some advantages. Grain distributors allow for more even distribution of grain within a container and more efficient use of container space. Rotating distributors typically offer reasonable distribution of grain within a container, but the moving parts and motors add to the cost and complexity of these devices and tend to make them more difficult to use and less reliable than distributors without moving parts. Further, using rotating parts to propel grain within a container can lead to unwanted separation of grain based upon size and weight and can lead to unwanted damage to the grain. Stationary distributors offer advantages over the use of no distributing device at all, but these stationary distributors typically do a poor job of evenly distributing grain and do not provide for dependable, predictable, repeatable distribution patterns within a container. Stationary distributors typically use troughs that allow grain to overflow in unpredictable and undesirable locations making it difficult if not impossible to predictably control grain distribution within a container. Further, stationary distributors typically do not provide for adequate grain distribution from the center of the container, do not provide for the formation of a repeatable, tightly packed series of grain piles, and do not provide for the formation of multiple piles of grain of substantially equal height. Both rotating and stationary distributors also do not provide adequate feedback concerning when grain has reached a desired height in the bin and make it difficult or impossible to provide repeatable grain distribution patterns or heights, particularly when this task is often delegated to a worker who may have little experience. Further, the uneven grain distribution that often results from the use of no distributor or from the use of known prior art distributors also makes blowers less efficient at drying the grain.

SUMMARY OF THE INVENTION

It is therefore an object of the present invention to provide a method and apparatus for distributing particulate material such as grain that allows for even and efficient distribution of the particulate material within a container such as a grain bin.

It is a further object of the present invention to provide a method and apparatus of the above type that allows for increased flexibility and control of grain distribution patterns.

It is a still further object of the present invention to provide a method and apparatus of the above type that uses a distribution device of simple, reliable construction.

It is a still further object of the present invention to provide a method and apparatus of the above type which offers even and efficient grain distribution without the need for moving parts.

It is a still further object of the present invention to provide a method and apparatus of the above type which provides the flexibility to evenly distribute grain in larger grain bins.

It is a still further object of the present invention to provide a method and apparatus of the above type which provides for the formation of multiple piles of grain along radii extending from the center of the container.

It is a still further object of the present invention to provide a method and apparatus of the above type which provides for the formation of a repeatable, tightly packed series of grain piles.

It is a still further object of the present invention to provide a method and apparatus of the above type which provides for the formation of multiple piles of grain of substantially equal height.

It is a still further object of the present invention to provide a method and apparatus of the above type in which the spreader has a hopper and a tube extending from the hopper, the tube having an opening disposed between distal and proximal end portions.

It is a still further object of the present invention to provide a method and apparatus of the above type in which the spreader has a second tube that is secured to the first tube, the second tube extending vertically downward from the opening in the first tube.

It is a still further object of the present invention to provide a method and apparatus of the above type in which grain poured into the hopper is discharged from each such tube at substantially the same height.

It is a still further object of the present invention to provide a method and apparatus of the above type in which grain introduced into the container is diverted to form radially aligned piles having radially aligned peaks.

It is a still further object of the present invention to provide a method and apparatus of the above type in which introduction of grain is discontinued when the peaks of the piles of grain within the container reach a desired, substantially equal height.

It is a still further object of the present invention to provide a method and apparatus of the above type which provides an easily seen indication of when grain has reached a desired height.

It is a still further object of the present invention to provide a method and apparatus of the above type which provides for more efficient drying of stored grain.

Toward the fulfillment of these and other objects and advantages, the apparatus of the present invention comprises a hopper and a tube secured to the hopper, the tube having an opening between distal and proximal end portions thereof. The apparatus may have a second tube secured to the first tube at the opening, and the second tube may extend substantially vertically downward. The lower end of the second tube may be aligned to terminate at a vertical level that is substantially equal to a vertical level of an opening in the distal end portion of the first tube. A Y-shaped tube may be secured to the distal end of the first tube to further distribute the grain. In use, grain is introduced into the hopper, and a first portion is passed to a first tube. The first portion of grain is divided into second and third portions, the second portion is passed through a second tube, and the third portion is passed to a distal end of the first tube. The third portion may be further divided into fourth and fifth portions within a third tube, and the grain may be discharged from each such tube at substantially the same height. Grain may be introduced to form piles until the peak of each such pile reaches a desired, substantially equal height, at which time the grain may be leveled within the container and the process repeated.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
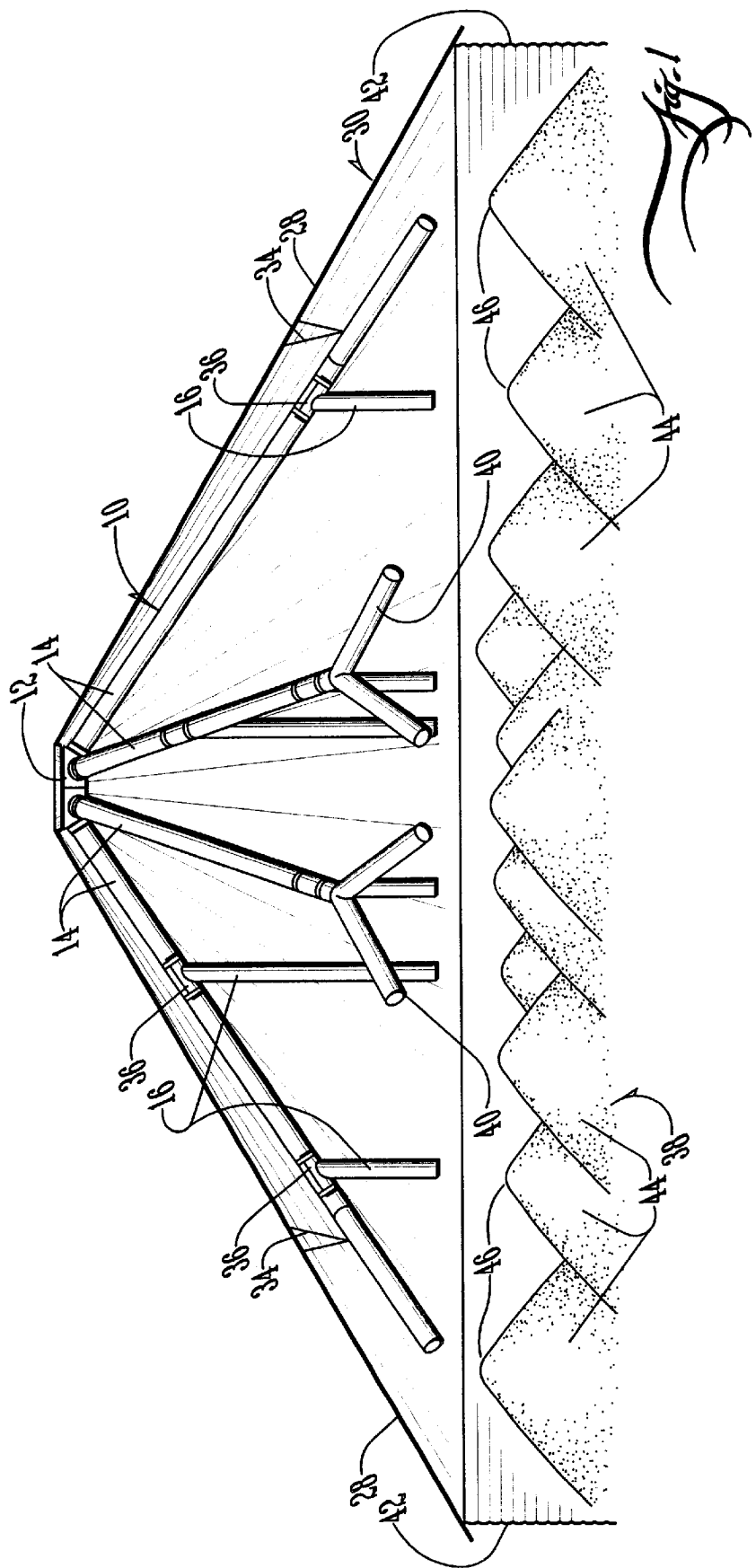
FIG. 1 is a partially exploded side elevation view of an apparatus for practicing the present invention.

Referring to FIG. 1, the reference numeral 10 refers in general to a particle spreader of the present invention. The particle spreader 10 has a hopper 12, one or more tubes 14 secured to and extending downwardly from the hopper 12, and one or more tubes 16 secured to and extending downwardly from the tubes 14.

Figure 2:
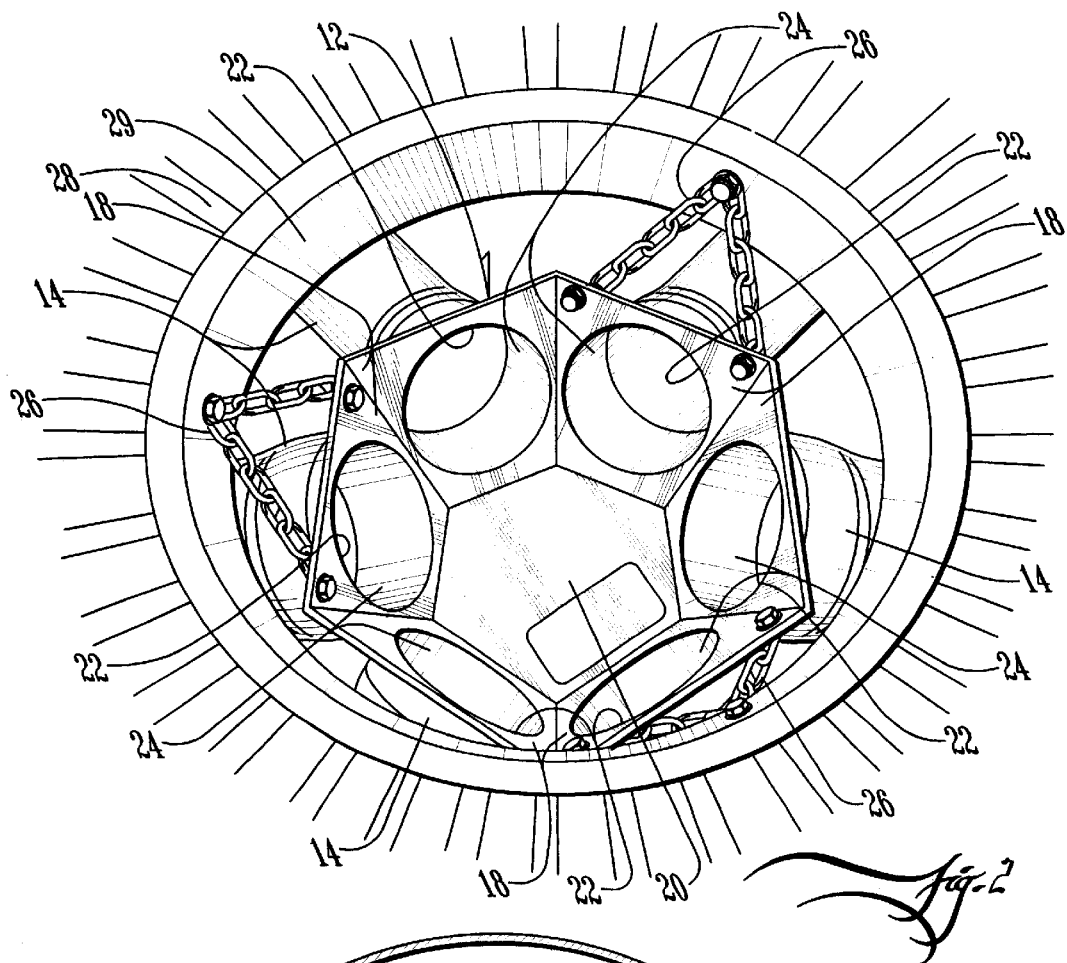
FIG. 2 is a partial overhead view of an apparatus of the present invention in place within a container.

Referring to FIG. 2, the hopper 12 has six side panels 18 and a floor panel 20. Each side panel 18 is approximately 14 inches across the top, 6-inches across the bottom, and a line extending perpendicularly between the top and bottom is approximately 14 5/16 inches. A circular opening 22 having a diameter of approximately 10 inches is formed in each side panel 18. The opening 22 is aligned approximately ½ inch from the top and approximately 3 13/16 inches from the bottom of the side panel 18. A cylindrical flange 24 having a height of approximately 3 inches is formed integrally with or affixed to the side panel 18 at the opening 22. The cylindrical flange 24 extends downward and outward from the side panel 18 at an angle a of approximately 55° from vertical. The six side panels 18 are substantially similar, so only one side panel is discussed in detail. The floor panel 20 may be pivotally secured to the side panels 18 so that it may be locked in a closed position and so that it may be opened when desired. Chains 26 secure the hopper 12 to the roof 28 of the container 30. It is understood that the hopper 12 may take any number of shapes, sizes, and configurations and may have any number of openings 22. It is also understood that the hopper 12 may be formed from any number of materials and may be secured to, above, or within the container 30 in any conventional manner.

Figure 3:
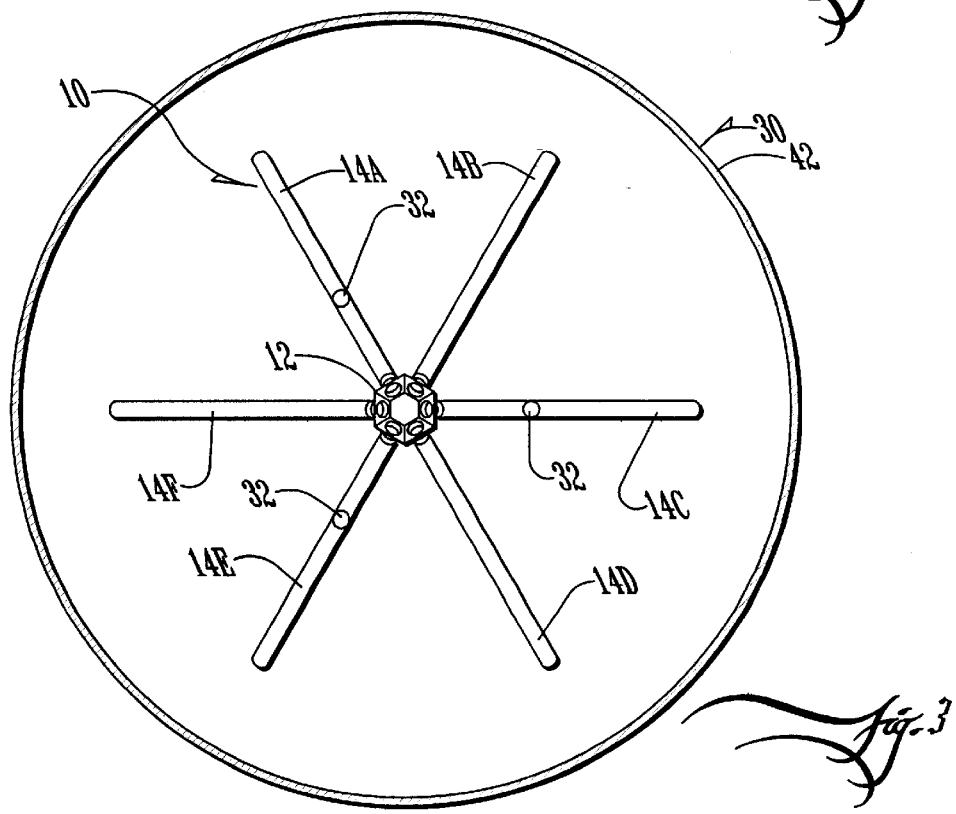
FIG. 3 is a bottom schematic view of an apparatus for practicing the present invention.
Figure 4:
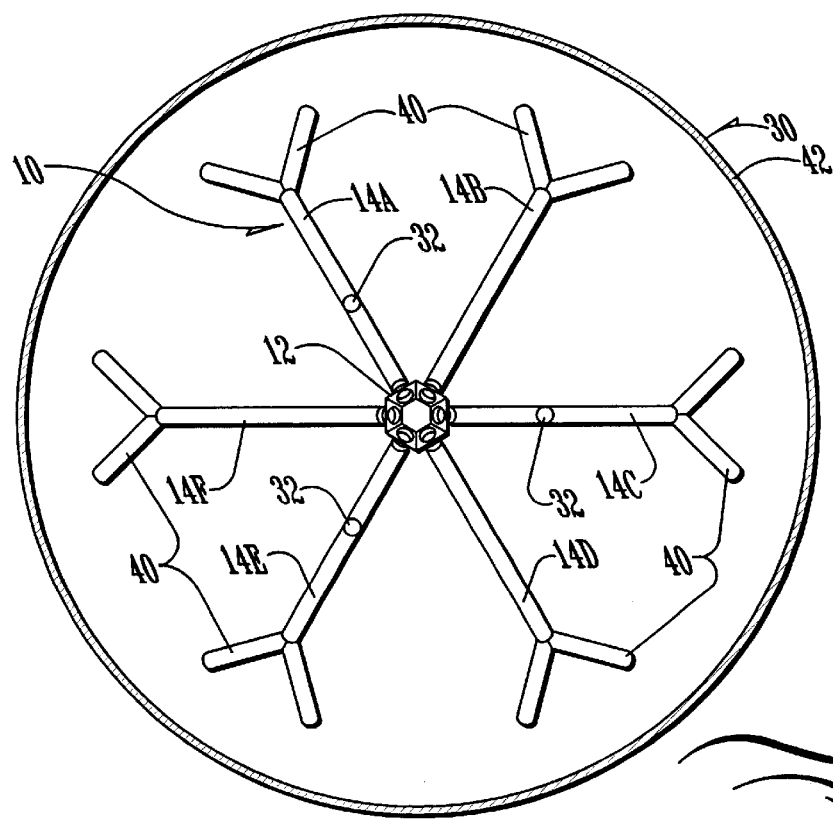
FIG. 4 is a bottom schematic view of an alternate embodiment of an apparatus for practicing the present invention.
Figure 5:
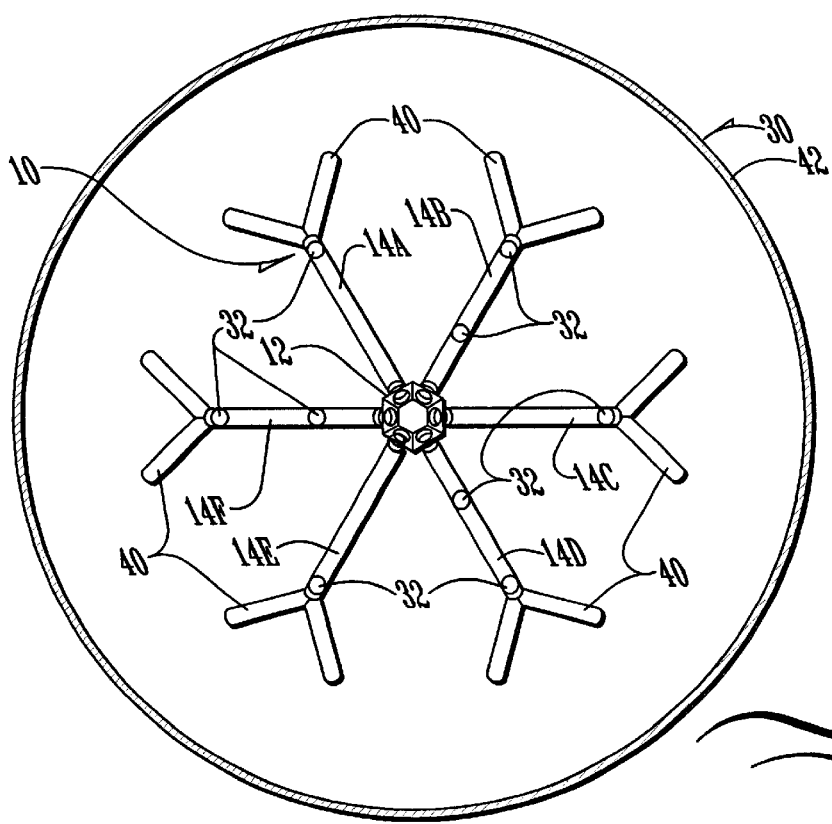
FIG. 5 is a bottom schematic view of another alternate embodiment of an apparatus for practicing the present invention.

Referring to FIGS. 1 and 2, a proximal end portion of a tube 14 is secured to each flange 24, and the tube 14 angles downward and outward from the hopper 12 to a distal end portion. The tube extends downward and outward from the hopper 12 at an angle of approximately 55° from vertical. Each tube 14 is preferably PVC pipe having an inner diameter of approximately 10 inches. The tube 14 is open at its distal and proximal ends. As best seen in FIGS. 3–5, each tube 14 may have one or more openings 32 disposed between the proximal and distal end portions. Chains 34 secure tube 14 to the roof 28 of the container 30. It is understood that any number of different styles, shapes, and sizes of tubes may be used. Although a tube 14 having a circular cross section area is preferred, tubes with any number of different cross section configurations may be used including but not limited to tubes having cross section configurations that are square, rectangular, oval, triangular, polygonal or irregular. Similarly, although the preferred embodiment has six tubes 14, any number of tubes 14 may be used. Further, the tubes 14 may be angled over a wide variety of downward slopes. Further still, the tubes 14 need not extend along radii of the hopper 12 and need not be straight.

Figure 6:
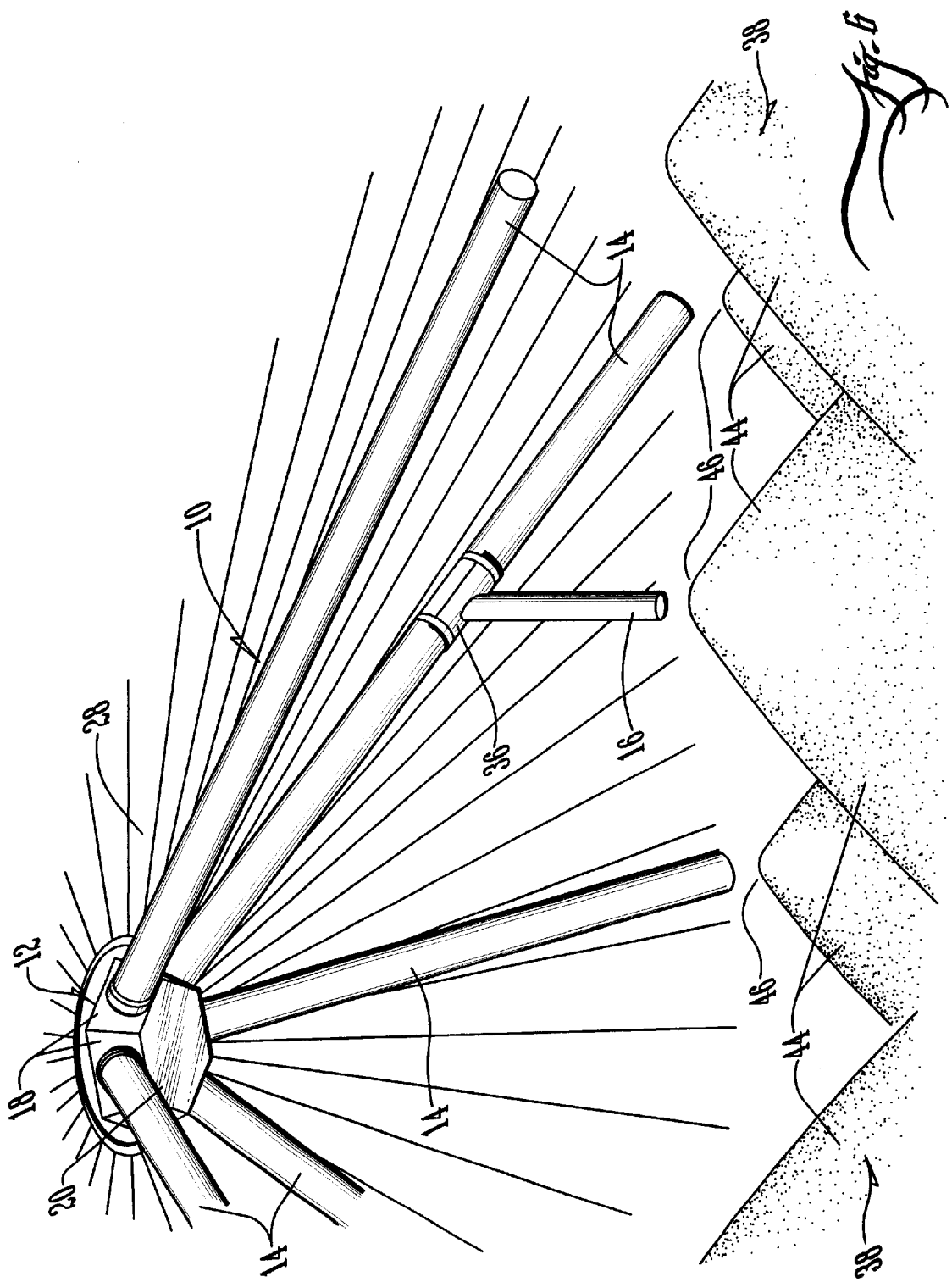
FIG. 6 is a partial side perspective view of an apparatus of the present invention.

Referring to FIGS. 1 and 6, one or more tubes 16 may be secured to one or more of the tubes 14, the tubes 16 being aligned with openings 32. Each tube 16 is preferably metal pipe having an inner diameter of approximately 6 inches. Each tube 16 may have a connecting flange formed integrally therewith or a separate connector 36 may be provided for securing the tube 16 over the opening 32 in tube 14. The connector 36 may be formed by cutting a partial segment of a pipe and cutting a hole therethrough. The connector 36 may be secured to tube 14 using metal bands or straps or by any conventional means. Tube 16 extends downward, substantially vertically, from tube 14. The length of each tube 16 is selected so that it extends to a desired height above the base of the container 30, preferably so that particles 38 are discharged from each tube 14 and 16 at substantially the same height above the base of the container 30. Although a metal pipe is presently preferred, it is understood that any range of materials may be use, including but not limited to PVC. Also, a tube 16 having a circular cross section area is preferred, tubes with any number of different cross section configurations may be used including but not limited to tubes having cross section configurations that are square, rectangular, oval, triangular, polygonal or irregular. Similarly, although the preferred embodiments use repeating patterns of none, one, or two tubes 16 per tube 14, a wide variety of numbers and patterns may be used to obtain the desired distribution. Further, the tubes 16 need not extend vertically downward from tubes 14 and need not all have the same discharge heights.

Referring to FIGS. 4 and 5, a Y-shaped divider tube 40 may be secured to the distal end of each tube 14 for further distribution of particles 38. The divider tube 40 is preferably PVC pipe having an inner diameter of approximately 10 inches. The divider tube 40 extends downward and outward from the distal end portion of the tube 14. It is understood that the Y-shaped divider tubes 40 may take any number of shapes, sizes, and configurations, that the divider tubes need not be used at all, and that, if used, need not be used on every tube 14.

Figure 7:
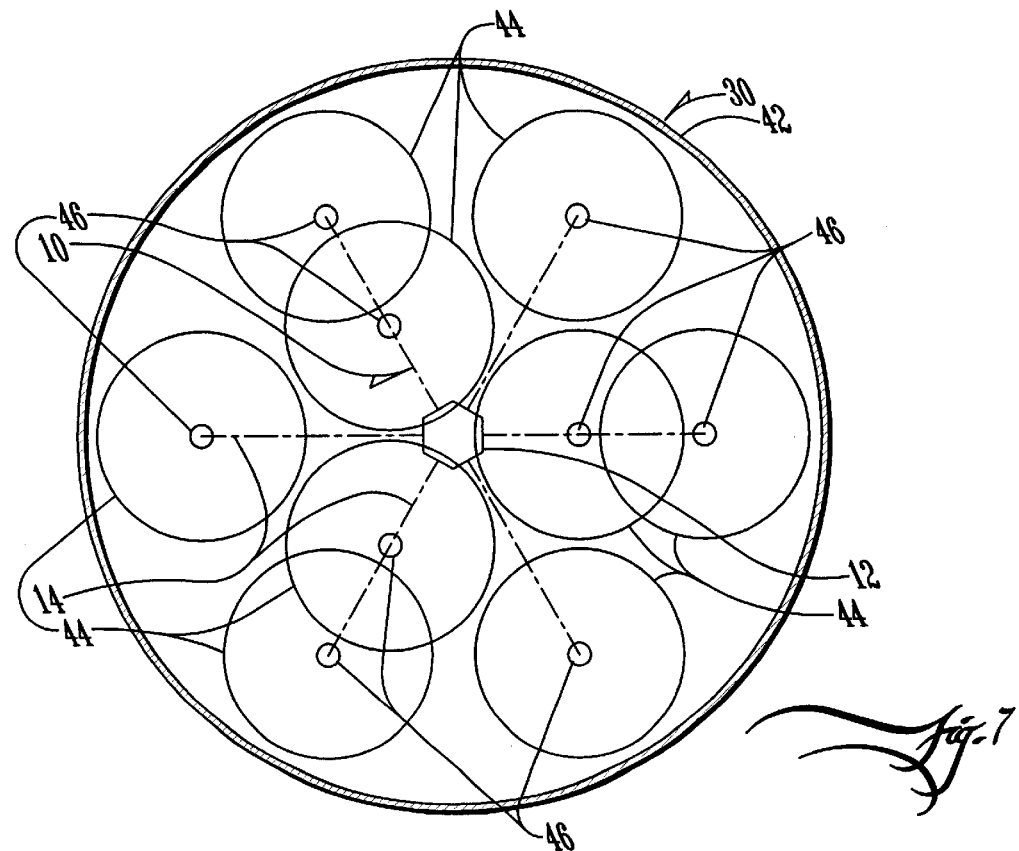
FIG. 7 is an overhead schematic view of a particulate matter distribution pattern of the present invention.

Referring to FIG. 3, this embodiment of a particle spreader 10 is best suited for smaller containers 30, such as grain bins having a diameter substantially within a range of from approximately 30 feet to approximately 40 feet. Every other tube 14A, 14C, and 14E is open at its proximal and distal ends and has an opening 32 disposed at an intermediate portion thereof, and every other tube 14B, 14D, and 14F is open only at its proximal and distal ends. This provides for a discharge pattern having nine discharge points, as depicted in FIG. 7. Tubes 16 are not shown in FIG. 3 for the sake of clarity, but tubes 16 are secured to tubes 14A, 14C, and 14E, aligned with openings 32. The length of each tube 16 is selected so that particles 38 are discharged from each tube 14A–14F and 16 at substantially the same height above the base of the container 30. It is understood that the containers need not have circular cross section areas but may take any number of shapes. It is also understood that each disclosed embodiment may be used in connection with a wide range of container 30 shapes and sizes.

Referring to FIG. 4, this embodiment of a particle spreader 10 is best suited for intermediate size containers, such as grain bins having a diameter of substantially within a range of from approximately 40 feet to approximately 45 feet. The embodiment depicted in FIG. 4 is substantially similar to the embodiment depicted in FIG. 3, except that Y-shaped dividers have been affixed to the end of each tube 14A–14F to provide for fifteen discharge points. Tubes 16 are not shown in FIG. 4 for the sake of clarity, but tubes 16 are secured to tubes 14A, 14C, and 14E, aligned with openings 32. The length of each tube 16 is selected so that particles 38 are discharged from each Y-shaped divider tube 40 and each tube 16 at substantially the same height above the base of the container 30.

Figure 8:
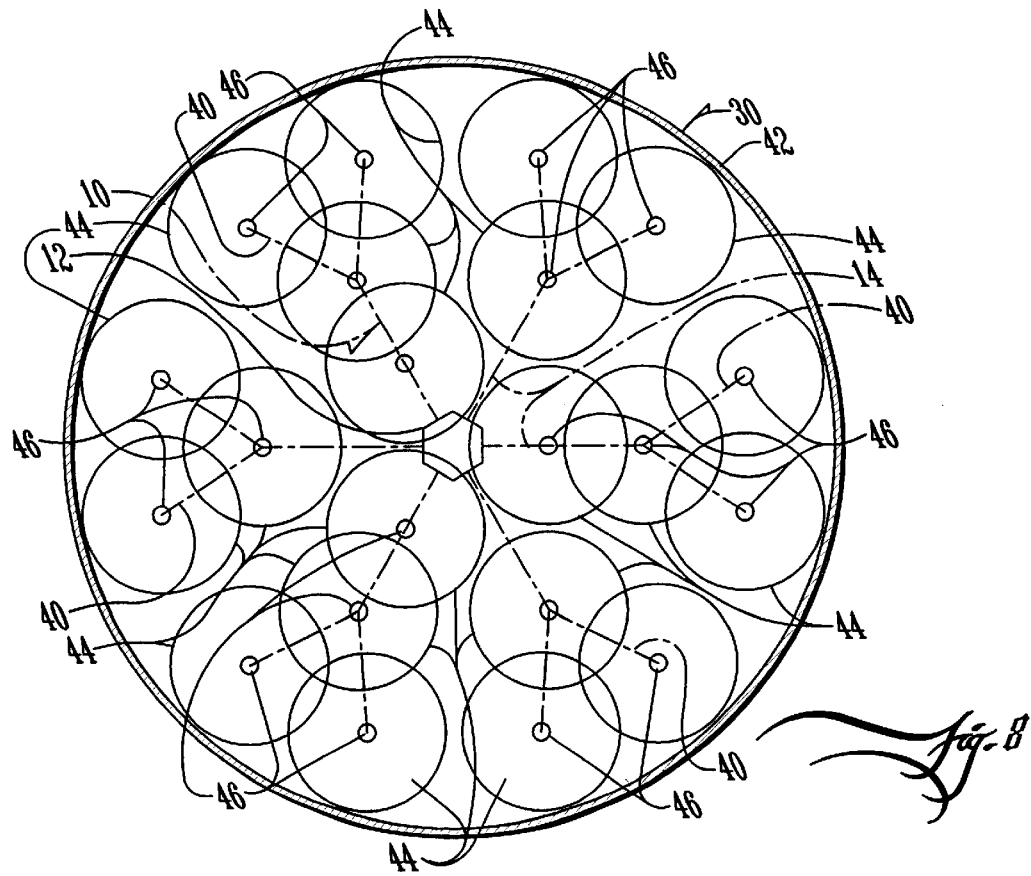
FIG. 8 is an overhead schematic view of an alternate particulate matter distribution pattern of the present invention.

Referring to FIG. 5, this embodiment of a particle spreader 10 is best suited for large containers, such as grain bins having a diameter of substantially within a range of from approximately 45 feet to approximately 60 feet. The embodiment depicted in FIG. 5 is similar to but larger than the embodiment depicted in FIG. 4. The embodiment depicted in FIG. 5 also differs in the number and alignment of the openings 32 in each tube 14A–14F. In that regard, each tube 14A, 14C, and 14E is open at its proximal and distal ends and has a single opening 32 disposed near the distal end portion thereof. Each tube 14B, 14D, and 14F is open at its proximal and distal ends and has two additional openings 32, one opening 32 disposed near the distal end portion thereof and another opening 32 disposed at an intermediate portion thereof. This provides for a discharge pattern having twenty-one discharge points, as depicted in FIG. 8. Tubes 16 are not shown in FIG. 5 for the sake of clarity, but tubes 16 are secured to tubes 14A–f, aligned with each opening 32. The length of each tube 16 is selected so that particles 38 are discharged from each Y-shaped divider tube 40 and each tube 16 at substantially the same height above the base of the container 30.

In operation, referring to the embodiment depicted in FIGS. 3, 6, and 7, particulate material such as grain 38 is conveyed through the opening 29 in the roof 28 of the container 30 and into the hopper 12. Referring to tube 14A, a first portion of the grain 38 passes into tube 14A and travels downward and outward through tube 14A until it reaches opening 32. At opening 32, this first portion of grain 38 is divided into a second portion and a third portion, with the second portion passing through the opening 32 and through tube 16. The remaining or third portion continues downward and outward through tube 14A to and through the distal end thereof where it is discharged at a position closer to a wall 42 of the container 30 than to the hopper 12. The grain 38 is discharged from tube 16 and the distal end of tube 14A at substantially the same height relative to the base of the container 30. The passage of grain 38 through tubes 14C and 14E is substantially similar to the passage of grain 38 through tube 14A and will not be discussed in detail. Referring to tube 14B, a portion of the grain 38 introduced into the hopper 12 passes to and through tube 14B. This portion of grain 38 passes downward and outward through tube 14B to and through the distal end thereof and is discharged at a position closer the wall 42 of the container 30 than to the hopper 12. Grain 38 is discharged from the distal end of tube 14B and the distal end of tube 14A at substantially the same height relative to the base of the container 30. The passage of grain 38 through tubes 14D and 14F is substantially similar to the passage of grain 38 through tube 14B and will not be discussed in detail.

Grain 38 passes from tubes 14A–14F and tubes 16 to form nine piles 44 having nine peaks 46. Although grain 38 will initially pass to each of the six tubes 14A–14F relatively evenly, there will typically be some modest differences between the rates at which grain 38 passes to each tube 14A–14F. Similarly, there will likely be at least slight differences; between the discharge rates of each tube 16 relative to other tubes 16 and relative to tubes 14A–14F. Initially, this will typically cause uneven grain distribution with grain piles 44 accumulating at different rates. The use of tubes 16 and the use of tubes 14A–14F rather than the use of open-top troughs helps correct for this natural tendency toward an uneven grain distribution. As best seen in FIG. 6, when the peak 46 of a grain pile 44 reaches a desired height, the discharge height of the tube 16 or of tube 14A–14F, the pile 44 will block further passage of grain 38 through that particular tube and will force incoming grain to travel to a different tube 16 or 14A–14F. If, for example, a grain pile 44 blocks passage of grain 38 through a tube 16 that is secured to tube 14A, any additional grain 38 passing from the hopper 12 to tube 14A will pass toward the distal end of tube 14A until a grain pile 44 formed by that point of discharge blocks passage of grain 38 through the distal end of 14A. When grain piles 44 block passage of grain 38 through the tube 16 that is secured to tube 14A and through the distal end of tube 14A, additional grain 38 in the hopper 12 will then pass to one of the other tubes 14B–14F.

This process will continue until each of the nine discharge points are blocked, at which time there will be nine grain piles 44 within the container 30 having nine discreet peaks 46 each having substantially the same height relative to the base of the container 30. As best seen in FIGS. 3 and 7, the peak 46 of the grain pile 44 formed under the tube 16 that is secured to tube 14A will be aligned with the peak 46 of the grain pile 44 formed under the distal end of tube 14A so that the two peaks 46 are disposed substantially within a vertical plane that passes through the center of the hopper 12 and so that a vertical line passing through the peak 46 under the tube 16 will pass between the peak 46 formed under the distal end of tube 14A and the center of the hopper 12.

When each of the nine discharge points is blocked, grain 38 will back up into and overflow from the hopper 12, indicating that it is time to discontinue introduction of grain 38, at least until the grain 38 in the container 30 has been leveled. This is an easily seen indicator that will allow even an inexperienced worker to accurately fill the bin to a desired height. A worker with a shovel typically levels the grain 38, shoveling grain from the piles 44 to other areas of the container 30 until the grain 38 has a relatively level top surface within the container 30. After the grain 38 is leveled so that piles 44 no longer block the discharge points of tubes 14A–14F and tubes 16, additional grain 38 may be introduced into the hopper 12 and through tubes 14A–14F and tubes 16 until piles 44 again block these discharge points. The process may be repeated as desired. Getting the height correct can be important. In light of the large diameters of the bins typically used, misjudging the height by even one foot can lead to hundreds, if not thousands, of bushels of unused storage space. The present invention eliminates the guesswork and allows even an inexperienced worker to accurately fill a bin to a desired height, simultaneously reducing the labor required and providing for efficient use of bin storage space.

The process of introducing particulate material into containers using the other embodiments of the present invention, such as those depicted in FIGS. 4 and 5 is very similar to the process discussed above and will not be repeated in detail.

The use of open-top troughs does not allow such even distribution and such control. If an open-top trough were used instead of a tube 14A–14F or tube 16, when a distal end of the trough became blocked, grain 38 would typically continue to pass from the hopper 12 down that trough and would simply spill over the sides of the trough in largely uncontrollable and unpredictable patterns. Such unpredictable, uncontrollable, and uneven grain distribution is undesirable; it would tend to provide inefficient use of container space, would tend to increase the labor required for leveling, and would make it much more difficult, if not impossible to accurately control the height of grain 38 introduced into a container 30.

Other modifications, changes and substitutions are intended in the foregoing, and in some instances, some features of the invention will be employed without a corresponding use of other features. For example, tubes 16 need not be used in connection with all or any of the openings 32 in tubes 14. Also, the angles, measurements, ranges and other quantitative data supplied are by way of example only and are not intended to limit the scope of the invention. Further, any number of tubes 14 may be used, and any number of openings 32 may be provided in the tubes 14. Further still, any number of desired grain distribution patterns with any number of piles 44 and peaks 46 may be used. Accordingly, it is appropriate that the appended claims be construed broadly and in a manner consistent with the scope of the invention.

What is claimed is:

1. A method of distributing particulate matter within a container, comprising:

(a) introducing said particulate material into a hopper;

(b) passing a first portion of said particulate material from said hopper to a first tube;

(c) dividing said first portion of said particulate material into a second portion and a third portion;

(d) passing said second portion of said particulate material through a second tube, discharging said second portion of said particulate material to form a first pile having a first peak;

(e) passing said third portion of said particulate material through a distal end of said first tube, discharging said third portion of said particulate material to form a second pile having a second peak; and (f) discontinuing introduction of said particulate material when said first and second peaks reach a first height at which said first and second peaks block passage of said particulate material through said second tube and through said distal end of said first tube, respectively.

2. The method of claim 1, further comprising, after step (f), leveling said particulate material within said container.

3. The method of claim 2, wherein said step of leveling said particulate material within said container comprises shoveling said particulate matter from said first and second peaks to other areas of said container until said particulate material has a relatively level top surface within said container.

4. The method of claim 2, further comprising, after leveling said particulate material within said container, introducing additional particulate material into said container to reform said first and second piles until said first and second peaks again reach said first height.

5. A combination comprising:

a container having a roof, said roof having an opening; and a particle spreader, comprising:

a hopper; and a first tube secured to said hopper, said first tube having distal and proximal end portions and having a first opening disposed between said distal and proximal end portions, said particle spreader being suspended within said container from said opening in said roof by chains.

\* \* \* \* \*